United States Patent [19]
Noji

[11] 3,879,704
[45] Apr. 22, 1975

[54] WARNING APPARATUS FOR VEHICLES OR THE LIKE

[75] Inventor: Akio Noji, Wako, Japan

[73] Assignee: Honda Giken Kogyo Kabushiki Kaisha, Tokyo, Japan

[22] Filed: Jan. 3, 1974

[21] Appl. No.: 430,584

[52] U.S. Cl. .............................. 340/52 F; 340/414
[51] Int. Cl. ............................................ G08b 19/00
[58] Field of Search ........ 340/21, 27 R, 52 R, 52 F, 340/181, 415, 414

[56] References Cited
UNITED STATES PATENTS

| | | | |
|---|---|---|---|
| 3,541,550 | 11/1970 | Hamre | 340/27 R X |
| 3,566,401 | 2/1971 | Smith et al. | 340/411 |
| 3,651,454 | 3/1972 | Venema | 340/52 F |
| 3,660,814 | 5/1972 | Fales | 340/52 F |

Primary Examiner—Alvin H. Waring

[57] ABSTRACT

A warning apparatus for a vehicle in which a plurality of detecting devices are arranged to be operated in response to respective input signals which are different in degree of importance. The detecting devices are provided on their output sides with respective sound signal sources so that, when any one of the detecting devices is selectively operated, the corresponding one of the sound signal sources is also selectively operated. In the event that two or more detecting devices are simultaneously operated, a single signal source corresponding to the input signal highest in degree of importance is selected for operation.

6 Claims, 1 Drawing Figure

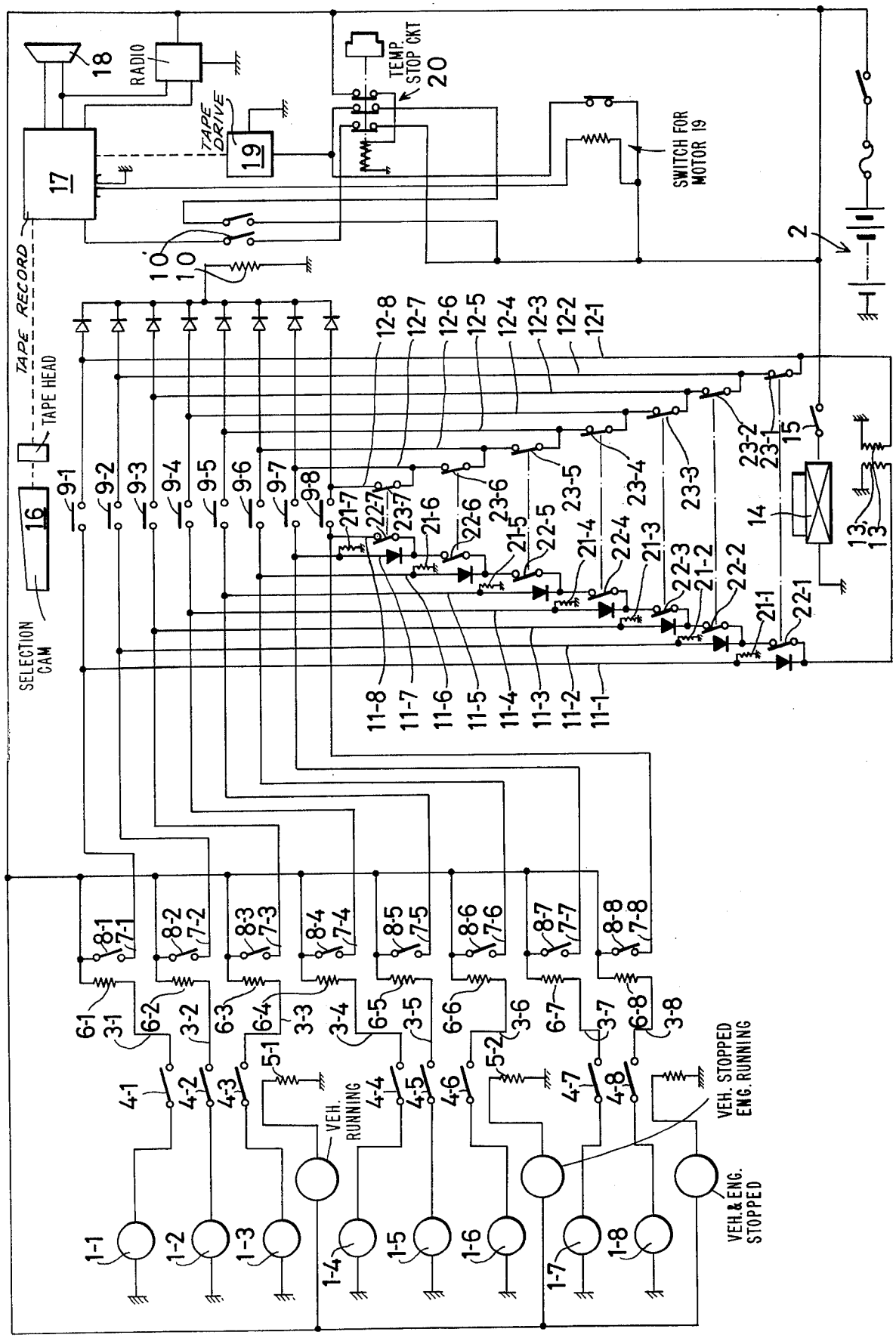

3,879,704

WARNING APPARATUS FOR VEHICLES OR THE LIKE

FIELD OF THE INVENTION

This invention relates to warning apparatus for vehicles such as motorcars and more particularly to apparatus of the type such that, in the event of tire pressure drop, lack of gasoline and so on, a warning is given by a sound such as a voice.

BACKGROUND

It is usual that the above kind of warning apparatus is of the visual type such as a lamp or the like. However, there is a fear with this type of apparatus that the warning might be overlooked by the driver. If, however, the warning apparatus is changed to an acoustic type, it is difficult to distinguish when two or more warnings are simultaneously sounded.

SUMMARY OF THE INVENTION

It is an object of the invention to provide a warning apparatus free from the above-mentioned defects.

According to this invention, in an apparatus of the type wherein detecting devices are arranged to be operated by respective input signals differing in degree of importance, the detecting devices are provided on their output sides with respective sound signal sources so that, when any one of the detecting devices is selectively operated, the corresponding sound signal source is selectively operated. In the event that two or more detecting devices are simultaneously operated, only a single sound signal source corresponding to the input signal of greatest importance is selected for operation.

BRIEF DESCRIPTION OF THE DRAWING

One embodiment of the invention is next explained with reference to the accompanying drawing in which the sole FIGURE is a schematic diagram of a warning apparatus circuit.

DETAILED DESCRIPTION

The drawing shows a case wherein the apparatus of the invention is applied to a motorcar. Eight detecting devices 1—1 . . . 1-8 corresponding to eight input signals are provided. These devices 1—1 . . . 1-8 are classified into three groups arranged to be selectively brought to operation depending on conditions in the motorcar.

More particularly, they are classified into a first group comprising the three devices 1—1 . . . 1-3 arranged for operation under a first condition in which the motorcar is being run, a second group comprising the three devices 1-4 . . . 1-6 arranged for operation under a second condition in which the motorcar is at a stop with its engine running, and a third group comprising the two devices 1-7, 1-8 arranged for operation under a further condition in which the motorcar is at a stop with the engine being stopped.

It is arranged that each group can be operated by a respective input signal such as, for example, mention below. More particularly, the detecting devices 1—1 . . . 1-3 are arranged to be operated, respectively, by three input signals representing tire pressure drop, lack of gasoline and excessive speed and, in this case, it is assumed that these three input signals are respectively lower in degree of importance in the order given. The detecting devices 1-4 . . . 1-6 are arranged to be operated, respectively, by three input signals representing brake oil level drop, brake system breakdown and engine oil level drop which are respectively lower in degree of importance in the order given. The detecting devices 1-7 and 1-8 are arranged to be operated, respectively, by two input signals representing lamp turn-off forgetting and steering handle lock forgetting which are respectively lower in degree of importance in the order given.

Respective circuits 3-1 . . . 3-8 for connecting these detecting devices 1—1 . . . 1-8 to an electric power source 2 are provided with respective preparation relay contacts 4-1 . . . 4-8 interposed therein. It is arranged so that, when three relay coils 5-1 . . . 5-3 provided in accordance with the foregoing motorcar conditions are selectively energized, contacts 4-1 . . . 4-8 can be selectively closed for bringing detecting devices 1—1 . . . 1-8 into their preparation for operation conditions.

More particularly, when the relay coil 5-1 is energized, the preparation relay contacts 4-1 . . . 4-3 are closed and the detecting devices 1—1 . . . 1-3 are brought into their preparation for operation conditions. When the relay coil 5-2 is energized, the preparation relay contacts 4—4 . . . 4-6 are closed and the detecting devices 1-4 . . . 1-6 are brought into their preparation for operation conditions. Finally, when the relay coil 5-3 is energized, the preparation relay contacts 4-7 and 4-8 are closed and the detecting devices 1-7 and 1-8 are brought to be in their preparation for operation conditions.

Respective relay coils 6-1 . . . 6-8 are interposed in the circuits 3-1 . . . 3-8, and respective relay contacts 8-1 . . . 8—8 cooperating with the relay coils 6-1 . . . 6-8 are interposed in respective output circuits 7-1 . . . 7-8 connected to the respective circuits 3-1 . . . 3-8. Additionally, the foregoing output circuits 7-1 . . . 7-8 are connected, through respective selection switches 9-1 . . . 9-8, to a single common relay coil 10 having a relay contact 10'.

Front stage branch circuits 11-1 . . . 11-8 and rear stage branch circuits 12-1 . . . 12-8 are provided on opposite sides of the selection switches 9-1 . . . 9-8. These circuits are connected to a pair of opposite polarity relay coils 13 and 13'. A rotary solenoid 14 is arranged to be rotated by an electric current for closing the selection switches 9-1 . . . 9-8 and is connected to the power source 2 through a relay contact 15 arranged to be opened and closed by the relay coils 13 and 13' so that, by the operation of any one of the detecting devices 1-1 . . . 1-8, the rotary solenoid 14 is given an angular rotation corresponding to the order of the operated device.

More particularly, if by the operation of the first order detecting device 1—1, the first order circuit 11-1, which is selected from the front stage branch circuits 11-1 . . . 11-8, is given a current flow, the relay coil 13 is energized and the relay contact 15 is closed. The rotary solenoid 14 starts to rotate. At the first angular rotation thereof, the first order switch 9-1, which is selected from the selection switches 9-1 . . . 9-8, is closed, so that the first order circuit 12-1 of the rear stage branch circuits 12-1 . . . 12-8 is also given a current flow. Thereby, the relay coil 13' is energized and, in conjunction therewith, the relay contact 15 is opened and the rotary solenoid 14 is stopped at the corresponding point of time. The above operation is similarly carried out by the operation of any of the detecting devices 1-2 ... 1-8.

To sum up, on the operation of any one of the detecting devices 1—1 ... 1-8, the rotary solenoid 14 is rotated by an angle corresponding to the order thereof and is automatically stopped in proper position. A selection cam 16 arranged to be rotated in conjunction with the rotary solenoid 14 is provided so that any one of a plurality of sound signal sources arranged separately is selected.

As for the sound signal sources, a tape mounted within a tape recorder 17 is previously provided with plurality of recorded zones in multi-channel form, and a playing head cooperating therewith is arranged to move upwards and downwards for selecting the same. In this case, the relay contact 10' is used to selectively connect the tape recorder 17 with the power source 2.

Component 18 is a speaker, component 19 is an electric motor for tape driving, and component 20 is a circuit for a temporary stop.

When, among the detecting devices 1—1 ... 1-8, for example, two devices are simultaneously operated, they are treated in the order of the degree of importance. For effecting this, the front stage branch circuits 11-1 ... 11-8 and the rear stage branch circuits 12-1 ... 12-8 are specially constructed. The front stage branch circuits 11-1 ... 11-7 are respectively connected to their respective "next-order" circuits 11-2 ... 11-8 through respective relay contacts 22-1 ... 22-7 of respective relay coils 21-1 ... 21-7 connected thereto. Similarly, the rear stage branch circuits 12-1 ... 13-7 are respectively connected to their respective "next-order" circuits 12-1 ... 12-8 through respective second relay contacts 23-1 ... 23-7 of respective relay coils 21-1 ... 21-7 connected thereto. If two detecting devices 1—1 and 1-2 are, for example, simultaneously operated and, accordingly, the front stage circuits 11-1 and 11-2 are simultaneously supplied with current by the energization of the first relay coil 21-1 connected to the first circuit 11-1, the relay contacts 22-1 and 23-1 are opened and therefore the second circuits 11-2 and 12-2 are both made inoperative, so that almost the same operation as described above may be obtained only by the first circuits 11-1 and 12-1. Only when the first detecting device 1—1 becomes inoperative, can the second circuits 11-2 and 12-2 become operative. Thus, operation by priority can be obtained. This is almost the same in the case of the simultaneous operation of two other detecting devices such as, for example, 1—1 and 1-3 or 1-2 and 1-3.

The operation of the apparatus will next be explained in connection with a case where the detecting devices 1—1 ... 1-3 have been prepared for operation by the energization of the relay coil 5-1. In this case, if any one of the detecting devices 1—1 ... 1-3 is operated, the corresponding one among the three sound signal sources, that is, the corresponding channel on the tape is selected for operation. If the first detecting device 1—1 is operated, for example, by the input signal of tire pressure drop, the corresponding relay coil 6-1 is energized to close the relay contact 8-1, so that the corresponding circuit 7-1 is operated. Through the corresponding front stage branch circuit 11-1, the relay coil 13 is operated to close the contact 15. If, thereby, the rotary solenoid 14 is rotated, the first selection switch 9-1 is closed by the first angular rotation thereof, so that the first circuit 12-1 of the rear stage branch circuits 12-1 ... 12-8 is also operated to operate the relay coil 13'. As a result, the two relay coils 13 and 13' are both operated. Because of the opposite polarity thereof, the contact 15 is opened and the rotary solenoid 14 is stopped at that angular position which is the position where it closed the first selection switch 9-1. In this case, the relay coil 10 is energized to close the contact 10' so that the tape recorder 17 is brought into its operative condition, while the selection cam 16 moving in conjunction with the rotary solenoid 14 is rotated through the corresponding angle. Thereby, the first order channel, that is, the first sound signal source on the tape in the tape recorder 17 is selected and thereby the first order sound is obtained at the speaker 18. This is almost the same in the case of the operation of any of the second and third detecting devices 1-2 and 1-3.

When, however, two or more of the detecting devices 1—1 ... 1-3 are simultaneously operated and respective sound signal sources are simultaneously operated, it might become difficult to distinguish the same by hearing. This invention provides that the more important alarm is given preferential operation.

If the case is considered in which the first and second detecting devices 1—1 and 1-2 are simultaneously operated by two input signals of tire pressure drop and lack of gasoline, by the energization of the first circuit 11-1 of the front stage branch circuits 11-1 ... 11-8, the relay coil 21-1 connected thereto is energized to open the corresponding relay contact 22-1, so that the second circuit 11-2 is rendered inoperative despite the operation of the second detecting device 1-2. Thus, only the first order sound signal can be obtained. If the first detecting device 1—1 is made inoperative by removing the tire pressure drop defect, the second detecting device 1-2 thus becomes operative. In this case, it is equal to the case of the operation of a single detecting device as mentioned before. Thus, the second order sound signal corresponding to the second detecting device 1-2 can be obtained.

According to the invention, at the time of operation of a single detecting device, a single sound signal corresponding thereto can be obtained. At the time of simultaneous operation of two or more detecting devices, a sound signal is obtained by priority only for the one of highest degree of importance. Thus, it can be prevented that a plurality of sounds are mixed. Further, when an input signal of higher degree of importance is removed, the next most important degree of sound signal can be obtained.

What is claimed is:

1. Warning apparatus comprising a plurality of detecting devices for detecting different conditions having sequential degrees of importance, alarm means responsive to said detecting devices for producing respective and different sound alarms for each condition, and further means coupling said devices to said alarm means and providing, in the event of simultaneous operation of more than one said device, for the producing of a sound alarm corresponding only to the detected condition of highest degree of importance, said further means including a plurality of parallel circuits coupled between respective of said devices and said alarm means, relay coils in respective of said circuits and contact means cooperating with said coils and arranged in respective of said circuits to open the circuits corresponding to lesser degrees of importance when a circuit corresponding to a higher degree of importance is actuated.

2. Apparatus as claimed in claim 1 comprising a second plurality of circuits corresponding to the first plurality, contact means in the second plurality corresponding to and operable with the first said contact means, switches coupling respective and corresponding of parallel circuits, a solenoid for sequentially operating said switches, and coils coupled to respective of said pluralities of parallel circuits for twisting the solenoid on and off to control the extent of movement of the same.

3. Apparatus as claimed in claim 2 comprising a selection means controlled by said solenoid to select a sound alarm from said alarm means.

4. Apparatus as claimed in claim 3 comprising alarm actuating means coupled to the second said plurality of parallel circuits and to said alarm means for actuating the latter.

5. Apparatus as claimed in claim 4 comprising temporary stop means coupled to said actuating means.

6. Apparatus as claimed in claim 2, wherein said devices are divided into groups, comprising means for selectively preparing the devices of the respective groups for operation.

* * * * *